Nov. 8, 1960  C. J. YARRICK  2,959,714
TWO POSITION ESCUTCHEON
Filed Aug. 28, 1956  2 Sheets-Sheet 1
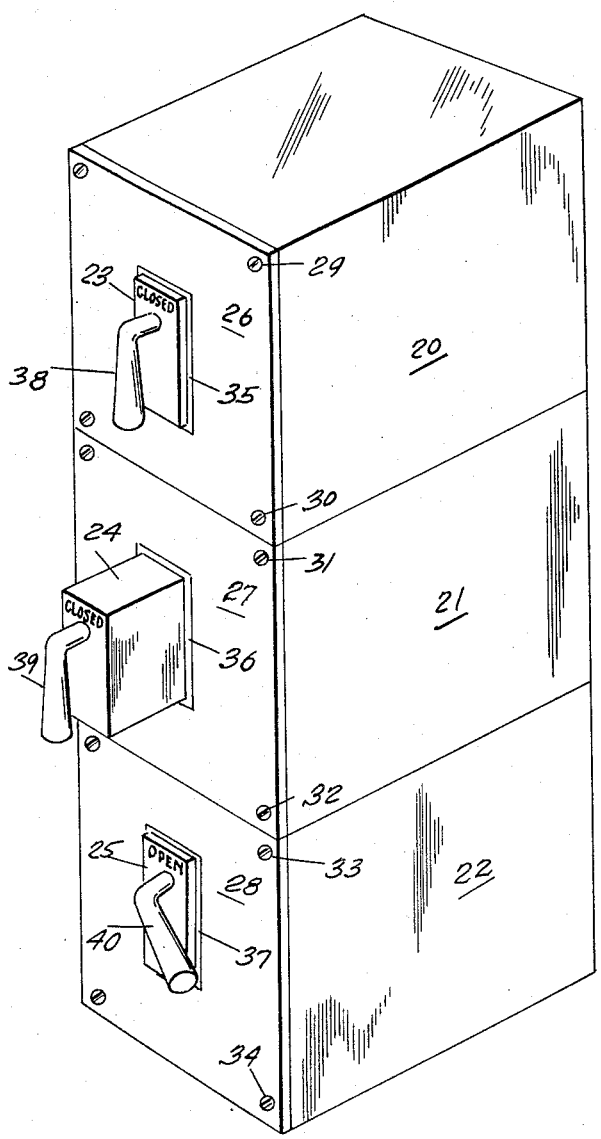
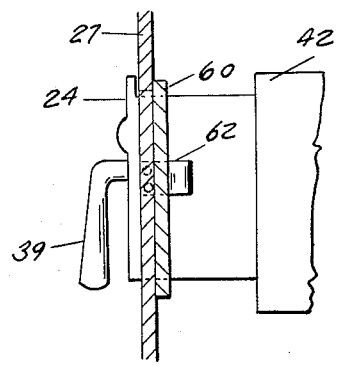
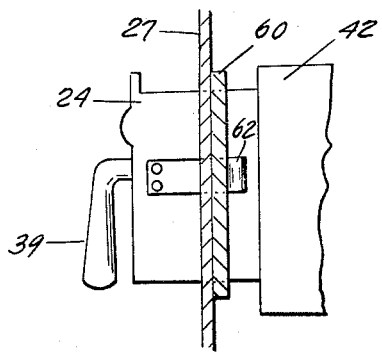
INVENTOR.
CHARLES J. YARRICK
BY Ostrolenk Faber
Gerb & Soffen
ATTORNEYS Nov. 8, 1960 C. J. YARRICK 2,959,714
TWO POSITION ESCUTCHEON
Filed Aug. 28, 1956 2 Sheets-Sheet 2
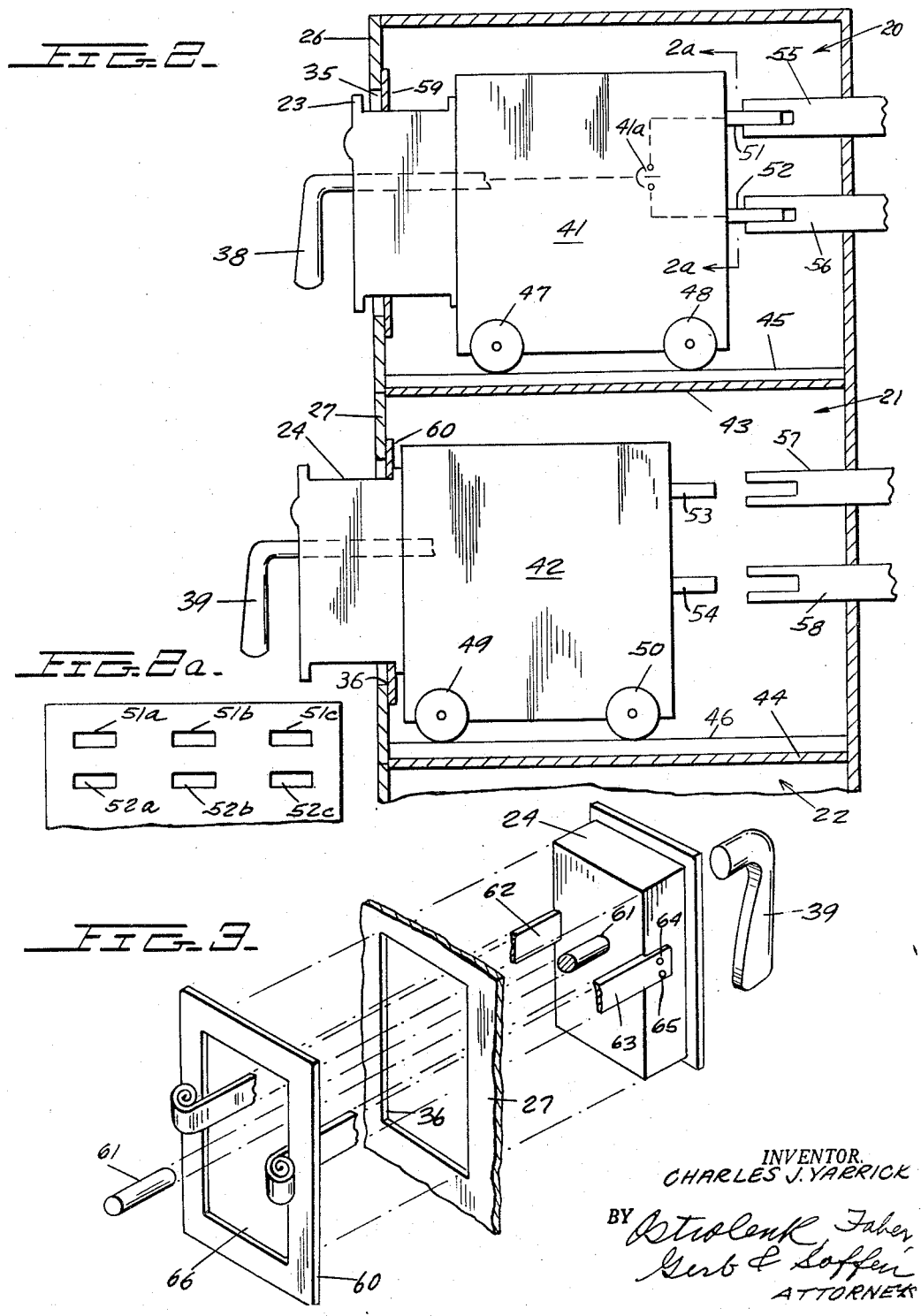
INVENTOR.
CHARLES J. YARRICK
BY Ostrolenk, Faber,
Gerb & Soffen
ATTORNEYS

United States Patent Office 2,959,714
Patented Nov. 8, 1960

2,959,714

TWO POSITION ESCUTCHEON

Charles J. Yarrick, West Collingswood, N.J., assignor to I-T-E Circuit Breaker Company, Philadelphia, Pa., a corporation of Pennsylvania Filed Aug. 28, 1956, Ser. No. 606,597

7 Claims. (Cl. 317—99)

This invention relates to circuit breakers which are mounted in enclosed housings and movable between test and operating positions and is more specifically related to a circuit breaker having a first and second escutcheon position to allow movement of the circuit breaker between its test and operating positions without opening the switchgear door.

In previous types of panel mounted circuit breakers, it has been necessary to open the switchgear door to gain access to the circuit breaker for movement thereof between test and operating positions. That is to say, it is necessary to open a cubicle in order to connect or disconnect the circuit breaker primary disconnect contacts which are usually mounted at the rear of the cubicle. When the circuit breaker is moved to a position to disconnect its primary disconnect contacts or a test position, it is in many cases desirable to be able to close the panel or switch board door while tests are being performed. To this end, it has been necessary to increase the dimensions of the cubicle to thereby prevent the circuit breaker from interfering with the closing of the cubicle door.

The principle of my invention is to movably mount the circuit breaker within an enclosure wherein the circuit breaker has an elongated escutcheon which protrudes through and is substantially flush with a wall of the enclosure when in the operating position and the complete elongated escutcheon protrudes through the panel board aperture when the circuit breaker is moved to its test position.

Furthermore, in accordance with this novel invention, an internal escutcheon plate is resiliently mounted with respect to the circuit breaker and is biased into engagement with respect to the switchgear enclosure so as to form an effective seal between the elongated circuit breaker escutcheon and the panel board regardless of the position of the circuit breaker escutcheon.

In view of this novel construction, it is now seen that the circuit breaker which is movable with respect to its internal sealing escutcheon is operable between an operating and a test position with the panel wall closed and that the aperture through which the protruding escutcheon of the circuit breaker extends is always sealed by the internal escutcheon.

Since the escutcheon completes the panel wall when in its first or operating position, the circuit breaker is always available and no door need be provided to allow access to the circuit breaker for moving it to its test position or second escutcheon position.

Furthermore, since the circuit breaker substantially extends beyond the surface of its enclosure when moved to the second escutcheon position or test position, it is obvious that the enclosure dimensions may be decreased when compared to the past devices in which the enclosure dimensions are increased to allow the enclosure door to be closed when the circuit breaker is in the test position.

Accordingly, a primary object of this invention is to provide a novel enclosure mounted circuit breaker.

Another object of this invention is to provide a novel enclosure mounted circuit breaker which is operable between a test and operating position with the enclosure door closed.

Still another object of this invention is to provide an enclosure mounted circuit breaker having a novel two-position escutcheon for allowing a decrease in the enclosure dimensions and an operation of the circuit breaker between test and operating positions with the enclosure door closed.

Still another object of this invention is to provide a novel switch board arrangement wherein a circuit breaker mounted within an enclosure has an elongated escutcheon which can protrude through an aperture in the enclosure when moved to a test position, and a further escutcheon means which is resiliently mounted with respect to the circuit breaker is effective to seal the aperture in the enclosure in all positions of the circuit breaker.

Another object of my invention is to resiliently mount a sealing escutcheon to a movable circuit breaker having an elongated escutcheon whereby the sealing escutcheon is resiliently mounted to the elongated escutcheon and is concentric therewith and is further constructed to span the area between the periphery of an aperture through which the elongated escutcheon protrudes and the periphery of the elongated escutcheon for any position of the elongated escutcheon.

These and other objects of this invention will become apparent from the following description when taken in connection with the drawings, in which:

Figure 1 shows a circuit breaker cubicle for mounting three circuit breakers constructed in accordance with this invention, two of these circuit breakers being in an operating condition and one being in a test position.

Figure 2 shows a fragmentary side cross-sectional view of Figure 1 and more specifically illustrates the operation of the novel two-position escutcheon of this novel invention.

Figure 2a shows a view of the disconnect contacts for a three-phase circuit breaker.

Figure 3 is an exploded perspective view of my novel two-position escutcheon and more particularly illustrates the manner in which the internal escutcheon plate is biased against the cubicle wall.

Figure 4 is a side cross-sectional view of Figure 3 when the circuit breaker escutcheon is in the operating position.

Figure 5 is a view similar to Figure 4 but shows the circuit breaker escutcheon in a test position.

Referring now to Figure 1, it is seen that a three-high compartment comprised of compartments 20, 21 and 22 house circuit breakers having extending escutcheons 23, 24 and 25 respectively. Enclosures 20, 21 and 22 which could be of any desired type are provided with doors 26, 27 and 28 respectively, which are hinged at their left edge and are lockable by any desired means such as screws 29—30, 31—32 and 33—34 respectively. Each of doors 26, 27 and 28 are provided with apertures 35, 36 and 37 respectively through which escutcheons 23, 24 and 25 and their corresponding operating handles 38, 39 and 40 extend.

In the case of Figure 1, operating handle 38 of escutcheon 23 is shown as being in the operating condition or as will be seen hereinafter, as having its primary disconnect contacts engaged and the circuit breaker contacts closed. Escutcheon 25 similarly is in the operating condition, but the circuit breaker cooperating contacts are in the open position. The circuit breaker within compartment 21, however, is seen as being in the test position. That is, the protrusion of escutcheon 24 appreciably beyond the surface of door 27 visually indicates that the circuit breaker corresponding to operating handle 39 has its primary disconnect contacts in the disengaged or disconnected position.

Thus, it is seen that each escutcheon 23, 24 and 25 of Figure 1 has a first and second position. The first position such as that taken by escutcheons 23 and 25 is the operating position, whereas the second position is the protruding position of escutcheon 24 or the test position. Since each of the escutcheons 23, 24 and 25 are protrudable through their apertures 35, 36 and 37, respectively, it is clearly unnecessary that their doors be opened when moving the circuit breaker such as that of compartment 21 to the test position.

This novel construction, then, as well as offering easy visual indication as to whether the circuit breaker is in the test or operating position, further allows a decrease in the depth of the enclosure. This may be seen in Figure 1 for if escutcheon 24 were not protrudable through aperture 36 and it is desirable that door 27 is capable of being closed in the test position, then the enclosure dimension would have to be extended to at least the end of operating handle 39.

Figure 2 illustrates a portion of the device of Figure 1 in a side cross-sectional view and further shows the circuit interrupting devices 41 and 42 which are associated with escutcheons 23 and 24 respectively. More specifically, Figure 2 shows compartment 20 as having a bottom wall 43 and compartment 21 as having a bottom wall 44. Each of bottom walls 43 and 44 support a rail means 45 and 46 respectively, which guide the wheels 47—48 and 49—50 of circuit interrupting devices 41 and 42 respectively. It is to be noted, however, that the movable structure of Figure 2 is set forth for illustrative purposes only and that devices 41 and 42 could be movable within their compartments in any desired manner. By way of example, devices 41 and 42 could have the pantograph type mounting set forth in U.S. Patent No. 2,618,682 to Thumim.

Circuit interrupting devices 41 and 42 are further provided with primary disconnect contacts 51 and 52, and 53 and 54 wherein contacts 51 and 52 cooperate with externally connectible contacts 55 and 56 respectively and contacts 53 and 54 cooperate with similar externally connectible contacts 57 and 58 respectively.

Disconnect contacts 51 and 52 of Figure 2 are schematically shown as being connected through circuit breaker contacts 41a, these contacts being operable by the operating handle 38. Clearly, circuit breaker 41 could be of any well known type and could have the many well known types of automatic tripping means and arc extinguishing means for contacts 41a. By way of illustration, circuit interrupting devices 41 and 42 could be of the type set forth in copending application Serial No. 253,717, filed October 29, 1951, now Patent No. 2,770,701, issued November 13, 1956, entitled Escutcheon Device For Circuit Breakers to Charles J. Yarrick and assigned to the assignee of the instant application.

It is to be understood that circuit interrupting devices 41 and 42 could be single phase devices or multiphase devices and disconnect contacts 51 and 52 or 53 and 54 in the case of a multiphase device would be the disconnect contacts for only one phase and similar disconnect contacts for each of the other phases would be provided in a similar manner.

Figure 2a shows the three-phase case where contacts 51a—52a, 51b—52b, and 51c—52c correspond respectively to a first, second and third phase.

As in the case of Figure 1, Figure 2 shows that the circuit interrupting device or circuit breaker 41 has its primary disconnect contacts 51 and 52 connected to the external disconnect contacts 55 and 56 so that a circuit between the external conductors 55a and 56a may be opened or closed by contacting mechanism such as 41a which is internal of circuit breaker 41 and operable by operating handle 38, as well as by any desired automatic operating means.

The circuit interrupting device 42, however, which is constructed in a manner identical to that of device 41 is shown as having its primary disconnect contacts 53 and 54 disconnected from cooperating contacts 57 and 58. That is to say, device 42 which is wheel mounted by means of wheels 49 and 50 with respect to rail 46 has been rolled to a test position, its elongated two-position escutcheon 24 giving visual indication thereof.

As may be seen most clearly in Figure 2, apertures 35 and 36 of doors 26 and 27 need be large enough so as to fit over the largest cross-sectional portion of escutcheons 23 and 24. This is true since it is necessary to periodically open doors 26 and 27 for maintaining, inserting and removing the circuit interrupting device 41 as well as other equipment within the enclosure. Hence, a second internal escutcheon 59 and 60 is provided for escutcheons 23 and 24 respectively, these second escutcheons being resiliently mounted with respect to 23 and 24 so that apertures 35 and 36 may be completely sealed regardless of the position of escutcheons 23 or 24.

Figure 3 shows one manner in which internal escutcheons 59 and 60 may be mounted. More specifically, Figure 3 shows an exploded perspective view of escutcheon 24, a portion of mounting door 27 and internal escutcheon 60. In Figure 3, it is further seen that operating handle 39 is connected to a shaft 61 which protrudes into internal mechanism for subsequent operation of the circuit interrupting device.

The escutcheon 24 of Figure 3 is seen as having Neg'ator springs 62 and 63 attached thereto in any desired manner. By way of example, a Neg'ator spring 63 is shown as having one end thereof mounted flush with the surface of escutcheon 24 by screw means 64 and 65. The term Neg'ator is a registered trademark of American Machine and Metals, Inc. Neg'ator spring 62 obviously would be mounted in the same manner. The Neg'ator springs 62 and 63 are then seen as protruding through aperture 36 of door 27 and through the aperture 66 of the internal escutcheon 60.

The coil portions of Neg'ator springs 62 and 63 are inherently maintained in engagement with the internal surface of the internal escutcheon 60. Clearly, this type of spring arrangement will maintain internal escutcheon 60 in engagement with the internal surface of door 27 regardless of the position of escutcheon 24. By using Neg'ator springs as the coil springs 62 and 63, a constant biasing force is then assured, although a standard type of coil spring could have been utilized for Neg'ator springs 62 and 63.

The operation of these Neg'ator springs is more specifically shown in Figures 4 and 5. In the case of Figure 4, Neg'ator spring 62 is seen as having a portion of its length wound up when the escutcheon 24 is in operating position with respect to the door 27. When, however, escutcheon 24 is withdrawn to the test position of Figure 5, Neg'ator spring 62 is extended to thereby maintain internal escutcheon 60 in engagement with the internal surface of door 27.

Although I have described preferred embodiments of my novel invention, many variations and modifications will now be apparent to those skilled in the art. I prefer therefore to be limited, not by the specific disclosure herein, but only by the appended claims.

I claim:

1. In a circuit breaker movably mounted within an enclosure, a first and second cooperating disconnect contact; said first disconnect contact being connected to said circuit breaker and being movable therewith; said second disconnect contact being mounted with respect to said enclosure; said circuit breaker being movable between an operating and test position for respectively engaging and disengaging said first and second cooperating disconnect contacts; said enclosure having a door with an aperture therein; said circuit breaker having an elongated escutcheon extending therefrom formed of a single member having relatively smooth continuous walls positioned in registry with an aperture in said enclosure door; the depth of protrusion of said elongated escutcheon with respect to said aperture being varied responsive to movement of said circuit breaker between said test and operating positions; and a sealing escutcheon; said sealing escutcheon being resiliently mounted on said circuit breaker; said sealing escutcheon being constructed to substantially seal the area formed between the periphery of said aperture and the periphery of said elongated escutcheon; said sealing escutcheon extending from a position overlapping the interior portion of said aperture to a position adjacent said relatively smooth continuous walls; said position adjacent said relatively smooth continuous walls being removed from the end of said elongated escutcheon when said circuit breaker is in said operating position.

2. In a circuit breaker movably mounted within an enclosure, a first and second cooperating disconnect contact; said first disconnect contact being connected to said circuit breaker and being movable therewith; said second disconnect contact being mounted with respect to said enclosure; said circuit breaker being movable between an operating and test position for respectively engaging and disengaging said first and second cooperating disconnect contacts; said enclosure having a door with an aperture therein; said circuit breaker having an elongated escutcheon extending therefrom formed of a single member having relatively smooth continuous walls positioned in registry with an aperture in said enclosure door; the depth of protrusion of said elongated escutcheon with respect to said aperture being varied responsive to movement of said circuit breaker between said test and operating positions; a sealing escutcheon; said sealing escutcheon being resiliently mounted on said circuit breaker; said sealing escutcheon being resiliently maintained in engagement with the internal surface of said enclosure door adjacent said aperture and being constructed, when said circuit breaker is in either of said test or operating positions, to substantially seal the area formed between the periphery of said aperture and the periphery of said elongated escutcheon; said sealing escutcheon extending from a position overlapping the interior portion of said aperture to a position adjacent said relatively smooth continuous walls; said position adjacent said relatively smooth continuous walls being removed from the end of said elongated escutcheon when said circuit breaker is in said operating position.

3. In a circuit breaker movably mounted within an enclosure, a first and second cooperating disconnect contact; said first disconnect contact being connected to said circuit breaker and being movable therewith; said second disconnect contact being mounted with respect to said enclosure; said circuit breaker being movable between an operating and test position for respectively engaging and disengaging said first and second cooperating disconnect contacts; said enclosure having a door with an aperture therein; said aperture in said enclosure door being sufficiently large to encompass the largest cross-sectional area of said elongated protrusion to thereby permit opening of said door; said circuit breaker having an elongated escutcheon extending therefrom formed of a single member having relatively smooth continuous walls positioned in registry with an aperture in said enclosure door; the depth of protrusion of said elongated escutcheon with respect to said aperture being varied responsive to movement of said circuit breaker between said test and operating positions; a sealing escutcheon; said sealing escutcheon being resilient mounted on said circuit breaker; said sealing escutcheon being constructed to substantially seal the area formed between the periphery of said aperture and the periphery of said elongated escutcheon; said sealing escutcheon extending from a position overlapping the interior portion of said aperture to a position adjacent said relatively smooth continuous walls; said position adjacent said relatively smooth continuous walls being removed from the end of said elongated escutcheon when said circuit breaker is in said operating position.

4. In a circuit breaker movably mounted within an enclosure, a first and second cooperating disconnect contact; said first disconnect contact being connected to said circuit breaker and being movable therewith; said second disconnect contact being mounted with respect to said enclosure; said circuit breaker being movable between an operating and test position for respectively engaging and disengaging said first and second cooperating disconnect contacts; said enclosure having a door with an aperture therein; an elongated escutcheon; said elongated escutcheon extending from said circuit breaker and being formed of a single member having relatively smooth continuous walls; said aperture in said enclosure door being sufficiently large to encompass the largest cross-sectional area of said elongated escutcheon to thereby permit opening of said door; a sealing escutcheon; said sealing escutcheon being resiliently mounted on said circuit breaker; said sealing escutcheon being resiliently maintained in engagement with the internal surface of said enclosure door adjacent said aperture and being constructed, when said circuit breaker is in either of said test or operating positions, to substantially seal the area formed between the periphery of said aperture and the periphery of said elongated escutcheon; the position of said elongated escutcheon giving visual indication of the position of said first and second disconnect contacts; said sealing escutcheon extending from a position overlapping the interior portion of said aperture to a position adjacent said relatively smooth continuous walls; said position adjacent said relatively smooth continuous walls being removed from the end of said elongated escutcheon when said circuit breaker is in said operating position.

5. In a circuit breaker movably mounted within an enclosure, a first and second cooperating disconnect contact; said first disconnect contact being connected to said circuit breaker and being movable therewith; said second disconnect contact being mounted with respect to said enclosure; said circuit breaker being movable between an operating and test position for respectively engaging and disengaging said first and second cooperating disconnect contacts; said enclosure having a door with an aperture therein; an elongated escutcheon; said elongated escutcheon extending from said circuit breaker and being formed of a single member having relatively smooth continuous walls; said aperture in said enclosure door being sufficiently large to encompass the largest cross-sectional area of said elongated protrusion to thereby permit opening of said door; said circuit breaker having said elongated escutcheon positioned in registry with an aperture in said enclosure door; said elongated escutcheon protruding through said aperture when said circuit breaker is moved to said test position; said elongated escutcheon being substantially flush with respect to said aperture when said circuit breaker is moved to said operating position; and a sealing escutcheon; a spring connecting means; said sealing escutcheon being connected to said elongated escutcheon by said spring connecting means and being concentric therewith; said sealing escutcheon being positioned interiorly of said enclosure door and being constructed to span the area formed between the periphery of said aperture and the periphery of said elongated escutcheon; said spring connecting means biasing said sealing escutcheon toward said enclosure cover when said elongated escutcheon is in said test and said operating positions; said sealing escutcheon extending from a position overlapping the interior portion of said aperture to a position adjacent said relatively smooth continuous walls; said position adjacent said relatively smooth continuous walls being removed from the end of said elongated escutcheon when said circuit breaker is in said operating position.

6. In a circuit breaker movably mounted within an enclosure, a first and second cooperating disconnect contact; said first disconnect contact being connected to said circuit breaker and being movable therewith; said second disconnect contact being mounted with respect to said enclosure; said circuit breaker being movable between an operating and test position for respectively engaging and disengaging said first and second cooperating disconnect contacts; said enclosure having a door with an aperture therein; an elongated escutcheon; said elongated escutcheon extending from said circuit breaker and being formed of a single member having relatively smooth continuous walls; said aperture in said enclosure door being sufficiently large to encompass the largest cross-sectional area of said elongated protrusion to thereby permit opening of said door; said circuit breaker having an elongated escutcheon positioned in registry with an aperture in said enclosure door; said elongated escutcheon protruding through said aperture when said circuit breaker is moved to said test position; said elongated escutcheon being substantially flush with respect to said aperture when said circuit breaker is moved to said operating position; and a sealing escutcheon; a spring connecting means; said sealing escutcheon being connected to said elongated escutcheon by said spring connecting means and being concentric therewith; said sealing escutcheon being positioned interiorly of said enclosure door and being constructed to span the area formed between the periphery of said aperture and the periphery of said elongated escutcheon; said spring connecting means biasing said sealing escutcheon toward said enclosure cover when said elongated escutcheon is in said test and said operating positions; and spring connecting means comprising Neg'ator springs for maintaining a constant biasing force on said sealing escutcheon; said sealing escutcheon extending from a position overlapping the interior portion of said aperture to a position adjacent said relatively smooth continuous walls; said position adjacent said relatively smooth continuous walls being removed from the end of said elongated escutcheon when said circuit breaker is in said operating position.

7. In a circuit breaker movably mounted within an enclosure, a first and second cooperating disconnect contact; said first disconnect contact being connected to said circuit breaker and being movable therewith; said second disconnect contact being mounted with respect to said enclosure; said circuit breaker being movable between an operating and test position for respectively engaging and disengaging said first and second cooperating disconnect contacts; said enclosure having a door with an aperture therein; said circuit breaker having an elongated escutcheon extending therefrom formed of a single member having relatively smooth continuous walls positioned in registry with an aperture in said enclosure door; the depth of protrusion of said elongated escutcheon with respect to said aperture being varied responsive to movement of said circuit breaker between said test and operating positions; and a sealing escutcheon; said sealing escutcheon being resiliently mounted on said circuit breaker; said sealing escutcheon being constructed to substantially seal the area formed between the periphery of said aperture and the periphery of said elongated escutcheon; said sealing escutcheon extending from a position overlapping the interior portion of said aperture to a position adjacent said relatively smooth continuous walls; said position adjacent said relatively smooth continuous walls being removed from the end of said elongated escutcheon when said circuit breaker is in said operating position; said sealing escutcheon being a substantially flat member.

References Cited in the file of this patent

UNITED STATES PATENTS

| | | |
|---|---|---|
| 1,856,288 | Ogle | May 3, 1932 |
| 1,930,028 | Adam | Oct. 10, 1933 |
| 2,129,723 | Wood | Sept. 13, 1938 |
| 2,496,853 | Burns | Feb. 7, 1950 |
| 2,533,645 | Volgovskoy | Dec. 12, 1950 |
| 2,554,510 | Spicer | May 29, 1951 |
| 2,647,247 | Fulton | July 28, 1953 |
| 2,703,829 | Lingal | Mar. 8, 1955 |
| 2,811,618 | Cole | Oct. 29, 1957 |